Jan. 24, 1939.  H. F. ARNDT  2,144,956
MOUSE TRAP
Filed March 28, 1938
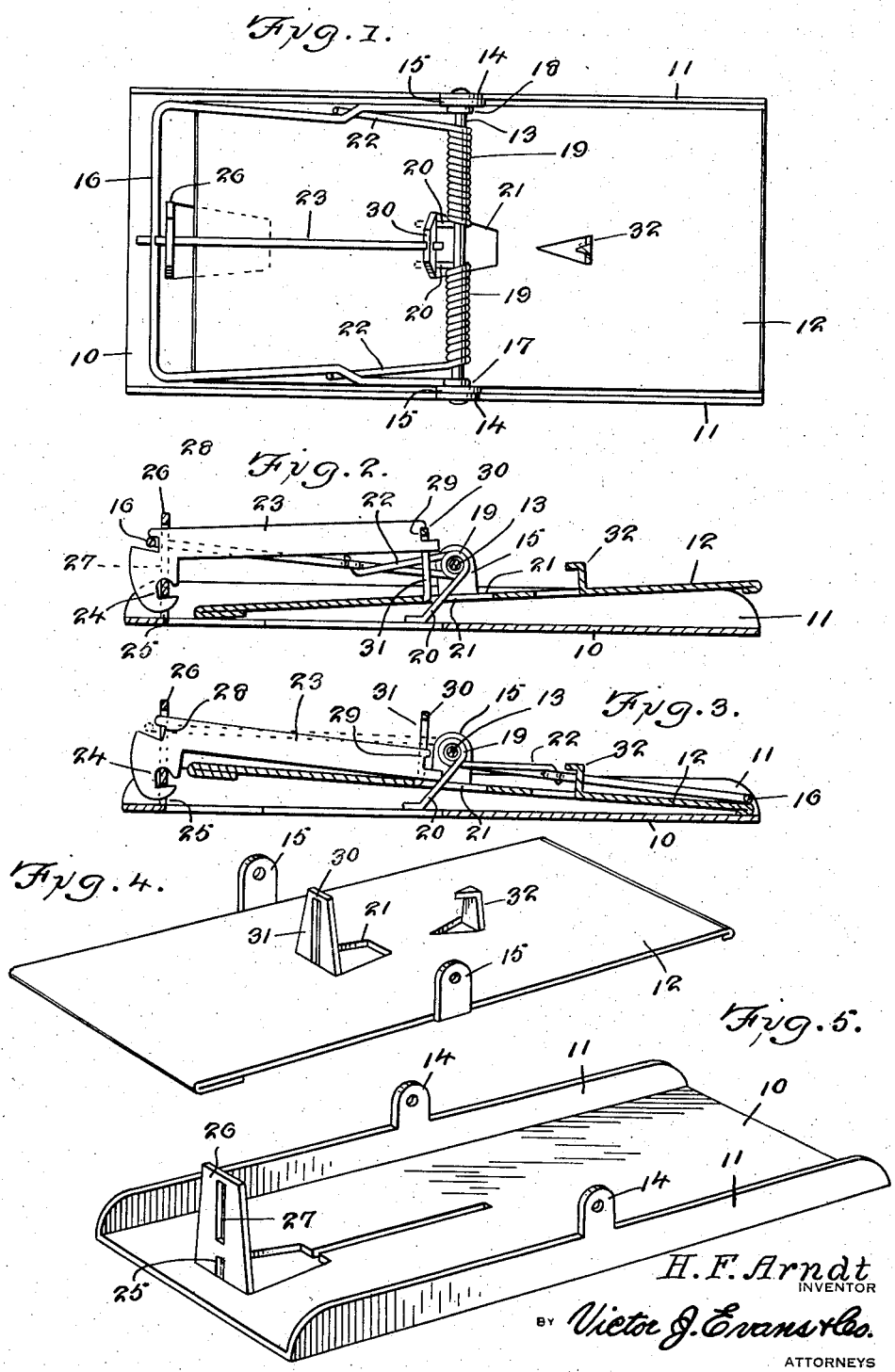

Patented Jan. 24, 1939

2,144,956

UNITED STATES PATENT OFFICE 2,144,956

MOUSE TRAP

Herman F. Arndt, Green Lake, Wis.

Application March 28, 1938, Serial No. 198,579

2 Claims. (Cl. 43—81)

This invention relates to mouse traps and has for an object to provide an all metal trap which may be easily maintained in a sanitary condition thus eliminating the odors resulting from the trapping of mice in wood traps to promote greater efficiency in trapping.

A further object is to provide a mouse trap in which the trigger for controlling the spring pressed striker or jaw, is pivoted at the end engageable with the jaw when the jaw is set, and at the free end is engageable with an upstanding lug carried by a rocking bait plate which rocks the lug away from the trigger when the animal steps upon the bait plate to release the spring jaw and trap the animal before the animal has time to back away from the trap.

A further object is to provide a trap of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a plan view of a mouse trap constructed in accordance with the invention.

Figure 2 is a longitudinal sectional view of the trap set.

Figure 3 is a longitudinal sectional view of the trap in unset position.

Figure 4 is a detail perspective view of the swinging bait plate of the trap.

Figure 5 is a perspective view of the base plate of the trap.

Referring now to the drawing in which like characters of reference designate similar parts in the various views, the all metal trap comprises a base plate 10 provided at its edges with upturned flanges 11. A bait plate 12 is arranged within the base and a shaft 13 pivotally supports the bait plate upon the base. The shaft extends transversely of the base plate centrally between the ends of the latter, and passes through lugs 14 carried by the side flanges of the base plate and through lugs 15 carried by the longitudinal side edges of the bait plate.

A U-shaped wire jaw or striker 16 is provided with eyes 17 at the ends which receive the shaft 13 and pivotally mount the striker on the shaft. A pair of helical springs 19 are sleeved upon opposite end portions of the shaft, one end 20 of each spring being engaged through an opening 21 in the bait plate and engaged against the base plate 10 while the opposite end 22 of the spring is hooked underneath a respective side of the U-shaped jaw or striker 16. When the jaw or striker is swung from the neutral position shown in Figure 3 to the set position shown in Figures 1 and 2 both springs will be tensioned in the usual manner.

The trigger 23 of the trap is in the nature of an elongated link having at one end a hook 24 which engages in a slot 25 formed in an upstanding lug 26 which rises from the base 10. The hook pivotally secures the trigger to the lug. The trigger passes through a slot 27 in the lug 26 and beyond the slot is provided with a notch 28 which is adapted to receive the transverse portion of the jaw or striker, as best shown in Figures 1 and 2.

The free end of the trigger is provided with a notch 29 disposed on the end edge of the trigger, the notch being adapted to receive the transverse member 30 of a substantially U-shaped lug 31 which is struck from the bait plate 12 in forming the beforementioned opening 21. When the jaw or striker is engaged in the notch 28 at the pivoted end of the trigger the bait plate 12 may be manually raised to set position in which position the transverse member 30 of the lug 31 engages in the notch 22 in the free end of the trigger and holds the jaw or striker set.

A bait hook 32 is struck from the bait plate 12 at that portion thereof upon which the animal must advance to reach the bait. As the animal steps upon the bait plate in an endeavor to reach the bait the plate will be rocked on the shaft 13 and the transverse portion 30 of the lug 31 will be withdrawn from the notch 29 in the trigger thus freeing the trigger to rock downwardly between the sides of the lug 30 and free the jaw or striker 16 which is instantly swung by the tension springs 19 to trap the animal against the bait plate.

Since the operation has been given as the description of the parts progressed it is thought that the invention will be fully understood without further explanation.

What is claimed is:

1. A trap comprising a base plate, a bait plate disposed above the base plate, hinge lugs extending from both plates, a pivot pin passed through said hinge lugs, a U-shaped spring jaw pivotally connected to the shaft, helical springs sleeved on the shaft and engaged through an opening in the bait plate, the opposite ends of said springs engaging respectively the base plate and the sides of the U-shaped jaw, a lug rising from the base plate, a trigger pivoted at one end in said lug, there being a notch in the trigger above the last named end to receive the cross member of said U-shaped jaw when the trigger is set, an upstanding inverted U-shaped lug rising from the bait plate between the first named lug and the pivot shaft, and means on the opposite end of said trigger detachably engageable with the transverse member of the inverted U-shaped lug and adapted to be disengaged from the trigger when the bait plate is depressed by the weight of an animal for releasing said jaw from said trigger.

2. A trap comprising a base plate provided at its side edges with upwardly directed flanges, a bait plate arranged within the base, a shaft pivotally supporting the bait plate upon the base plate, said shaft extending transversely of the bait plate centrally between the ends of the bait plate, lugs carried by the flanges of the base plate and by the side edges of the bait plate mounting the ends of the shaft, a spring pressed jaw pivotally mounted upon the pivot pin to swing in an arc of 180 degrees from one side of the pivot pin to the opposite side of the pivot pin, a lug extending upwardly from the base plate, a trigger having a hook pivotally engaged in an opening of said lug, there being a recess in the trigger above the hook for engaging the jaw to hold the jaw set, a member extending upwardly from the bait plate on the same side of the pivot pin as the lug, and means carried by the trigger detachably engaging the last named member and adapted to be disengaged upon the weight of an animal rocking the bait plate to release the jaw and trap the animal.

HERMAN F. ARNDT.